(12) United States Patent
Qiu

(10) Patent No.: US 6,930,414 B2
(45) Date of Patent: Aug. 16, 2005

(54) LINEAR ELECTRODYNAMIC SYSTEM AND METHOD

(75) Inventor: Songgang Qiu, Richland, WA (US)

(73) Assignee: Stirling Technology Company, Kennewick, WA (US)

( * ) Notice: Subject to any disclaimer, the term of this patent is extended or adjusted under 35 U.S.C. 154(b) by 0 days.

(21) Appl. No.: 10/684,806

(22) Filed: Oct. 14, 2003

(65) Prior Publication Data

US 2005/0077787 A1 Apr. 14, 2005

(51) Int. Cl.[7] .............................................. H02K 41/02
(52) U.S. Cl. ........................................ 310/12; 310/15
(58) Field of Search ..................................... 310/12–15

(56) References Cited

U.S. PATENT DOCUMENTS

| | | | |
|---|---|---|---|
| 5,389,844 A | | 2/1995 | Yarr et al. |
| 5,654,596 A | | 8/1997 | Nasar et al. |
| 6,499,972 B2 | * | 12/2002 | Yatsuzuka et al. .......... 417/417 |

FOREIGN PATENT DOCUMENTS

| | | | | |
|---|---|---|---|---|
| DE | 10055080 | * | 5/2004 | .......... H02K/33/12 |
| GB | 2373643 | * | 9/2004 | .......... H02K/15/03 |

* cited by examiner

*Primary Examiner*—Burton Mullins
(74) *Attorney, Agent, or Firm*—Brian L. Johnson; George C. Rondeau, Jr.; Davis, Wright, Tremaine, LLP

(57) ABSTRACT

A linear electrodynamic system for conversion of mechanical motion into electrical power or conversion of electrical power into mechanical motion allows for advantageous mass and size reductions. Magnet volume is increased through use of non-annular shaped magnets affixed to stator poles. Mover sections complementary in shape to the non-annular magnets. The mover, stator and associated windings used have reduced mass and size resulting in overall mass and size reductions of the innovative linear electrodynamic system compared with conventional linear electrodynamic systems of similar performance capability.

5 Claims, 13 Drawing Sheets

LINEAR ELECTRODYNAMIC SYSTEM AND METHOD

BACKGROUND OF THE INVENTION

1. Field of the Invention

The present invention is directed generally to electrodynamic systems and, more particularly, to linear alternators and linear motors.

2. Description of the Related Art

Linear electrodynamic systems including linear alternators and linear motors are particularly useful, for instance, in combination with Stirling cycle engines for electrical power generation and for refrigeration applications. These electrodynamic systems require substantial mass in their construction for adequate performance. Typically, iron laminations are used for the mover and stator components and copper wire is used for the windings.

Unfortunately, the amount of mass involved with these linear electrodynamic systems can be undesirable, for example, with situations where construction or operational costs are dependent upon equipment weight. As another example, for portable equipment, the amount of mass used for these linear electrodynamic systems can lessen the ease of use of the equipment.

BRIEF SUMMARY OF THE INVENTION

The present invention resides in a linear electrodynamic system having a stator with inwardly extending stator poles, windings wound around the stator poles, and magnetic material affixed to a portion of each of the stator poles. The stator defines an inner space with the stator poles positioned at the inner space, and the magnetic material has bore surfaces facing inward toward the inner space. The system further includes a mover positioned within the inner space for longitudinal and linear reciprocal movement therein. The mover has bore surfaces facing outward in correspondence with the bore surfaces of the magnetic material to define a gaseous gap between each of the correspondingly positioned ones of the bore surfaces of the magnetic material and the mover. The bore surfaces of the magnetic material and the mover having mating non-annular shapes.

In some embodiments of the system the bore surface of each magnetic material affixed to a portion of one of the stator poles has a convex shape. The bore surface may have an arc shape.

In some embodiments of the system the bore surface of each magnetic material affixed to a portion of one of the stator poles has a V shape. The bore surface may have a concave shape. Alternatively, the bore surface may have a convex shape.

In some embodiments of the system the bore surface of each magnetic material affixed to a portion of one of the stator poles has a parabolic shape. The bore surface may have a concave shape. Alternatively, the bore surface may have a convex shape.

The system may also include a housing with a longitudinal shaft movably coupled to the housing to longitudinally and linearly reciprocate relative to the housing in the longitudinal direction of the shaft. A stator is rigidly coupled to the housing, and shaped to define an inner space to receive a portion of the longitudinal shaft. The stator has stator poles extending inwardly toward that portion of the longitudinal shaft received by the stator. Windings are wound around the stator poles. Magnetic material is affixed to a portion of each of the stator poles. The magnetic material has bore surfaces facing inward. A mover is affixed to the shaft. The mover has bore surfaces facing outward in correspondence with the bore surfaces of the magnetic material to define a gaseous gap between each of the correspondingly positioned ones of the bore surfaces of the magnetic material and the mover. Portions of the bore surfaces of the magnetic material are closer to the shaft than portions of the bore surfaces of the mover.

The system may also be described as having portions of the bore surfaces of the magnetic material being the same distance from the shaft as portions of the bore surfaces of the mover. With the described arrangement, the magnetic material is positioned on the stator poles within the inner space to permit uninhibited longitudinal and linear reciprocal movement of the mover within the inner space while limiting rotational movement of the mover more than the distance of the gaseous gap existing between the correspondingly positioned ones of the inwardly facing surfaces of the magnetic material and the outwardly facing surface portions of the mover.

The present invention also includes a method comprising providing a stator with inwardly extending stator poles, and shaping the stator to define an inner space with the stator poles positioned at the inner space. Wire is wound around the stator poles to form stator pole windings. Magnetic material with bore surfaces is affixed to a portion of each of the stator poles with bore surfaces of the magnetic material facing inward toward the inner space. The bore surfaces of the magnetic material has a non-annular shape. A mover is provided which is positioned within the inner space for longitudinal and linear reciprocal movement therein. The mover has bore surfaces facing outward in correspondence with the bore surfaces of the magnetic material to define a gaseous gap between each of the correspondingly positioned ones of the bore surfaces of the magnetic material and the mover. The bore surfaces of the mover have a non-annular shape mating with the bore surfaces of the magnetic material.

Other features and advantages of the invention will become apparent from the following detailed description, taken in conjunction with the accompanying drawings.

BRIEF DESCRIPTION OF THE SEVERAL VIEWS OF THE DRAWING(S)

DETAILED DESCRIPTION OF THE INVENTION

As will be discussed in greater detail herein, an innovative linear electrodynamic system and method is disclosed to convert linear mechanical motion into an electrical current such as for a linear alternator for heat engines including Stirling cycle engines, or to convert electrical current into linear mechanical motion such as for a linear motor associated with mechanical cooling devices. Due to innovative concepts embodied therein and described below, the innovative linear electrodynamic system has size and weight advantages over conventional linear electrodynamic systems.

Figure 1:
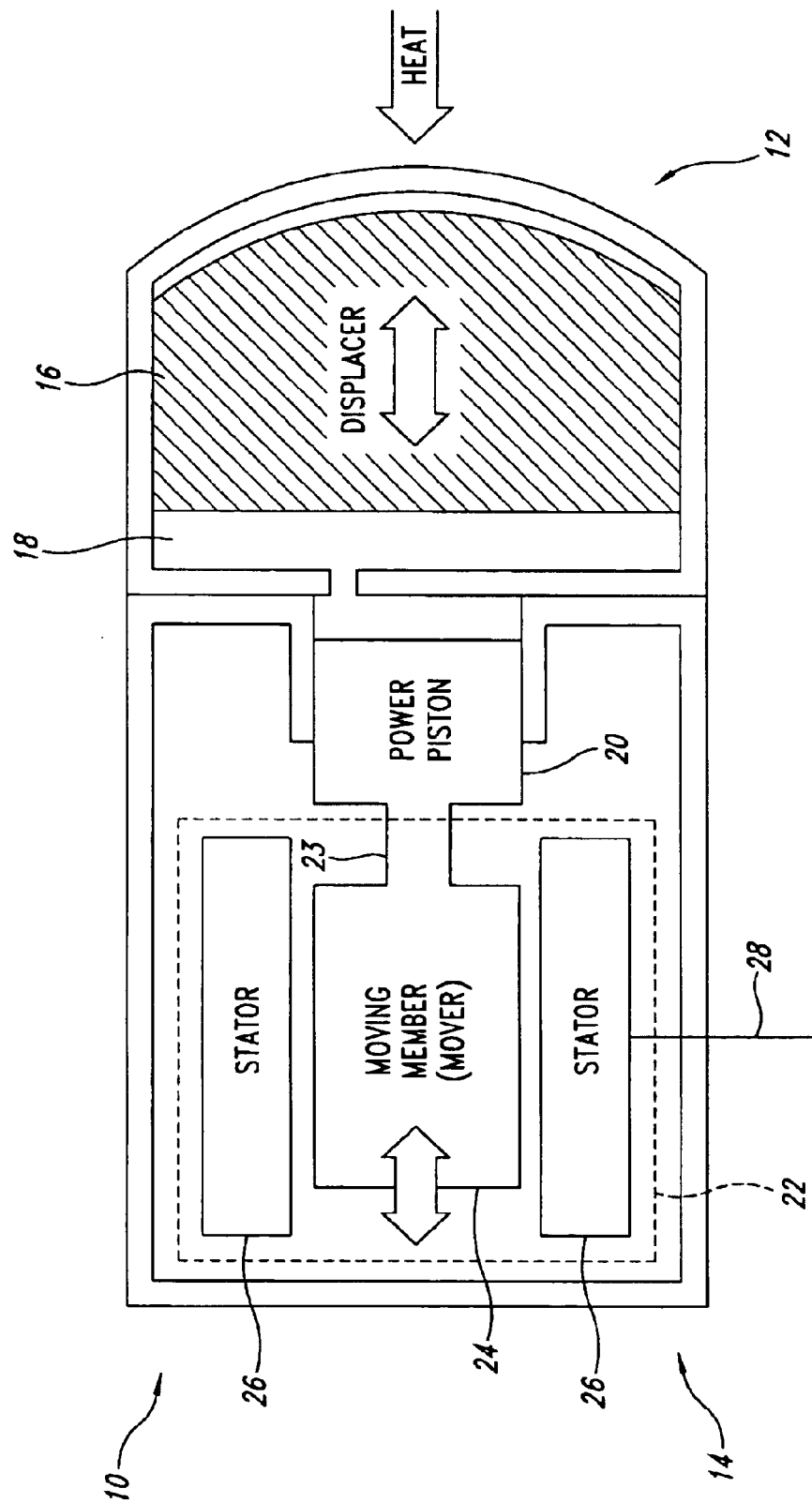
FIG. 1 is a schematic drawing of a conventional electrothermal system.
Figure 2:
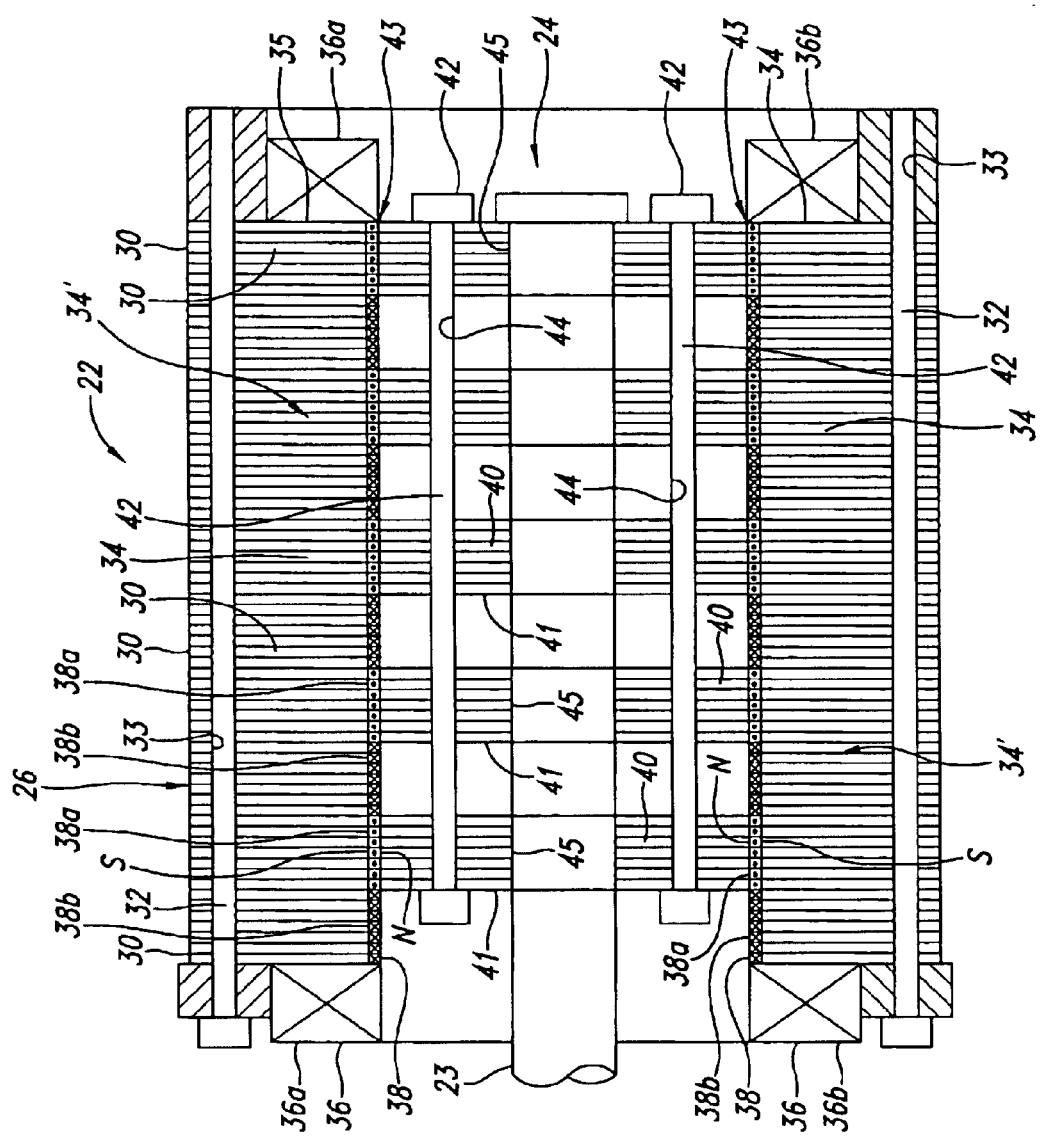
FIG. 2 is a cross-sectional view of the a conventional linear electrodynamic system of FIG. 1 with its mover in a first position.

A conventional electrothermal system 10 using a heat module 12 and a power module 14 is shown in FIG. 1. When in the form of a Stirling cycle engine, the heat module 12 has a displacer 16 and working fluid 18 in fluid communication with a power piston 20, which is part of the power module 14. The power piston 20 of the power module 14 is connected to a conventional linear electrodynamic system 22 through a shaft 23 coupled to a mover 24. The conventional linear electrodynamic system 22 further includes a stator 26 and an electrical line 28 to furnish or receive electrical power. The stator 26 has conventional stator laminations 30 stacked together and secured by stator connecting rods 32 positioned through stator connecting rod holes 33, as shown in FIG. 2 in which the mover 24 is in a first position.

Figure 3:
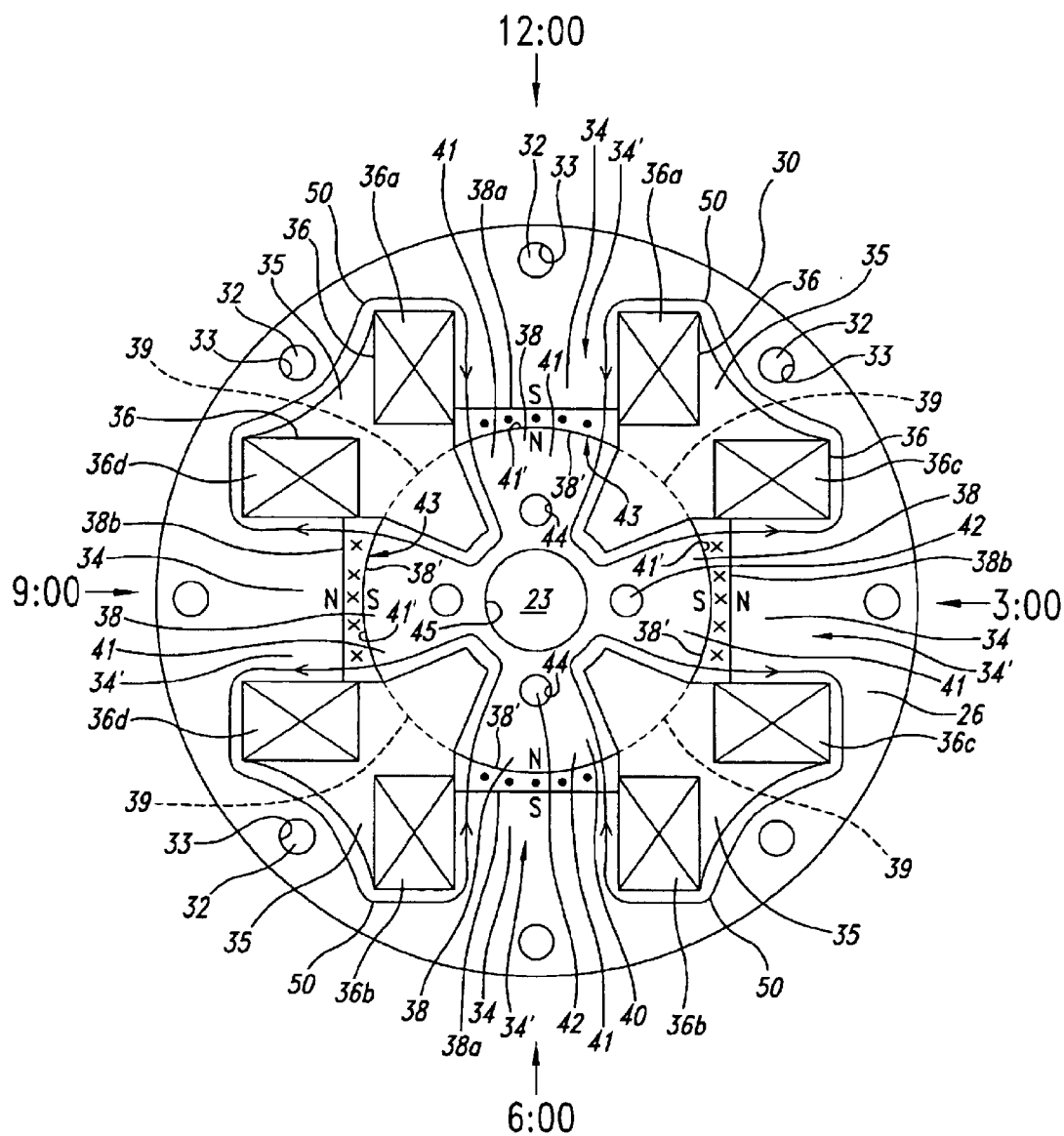
FIG. 3 is a top view of the conventional stator lamination and a conventional mover lamination pair associated with the mover in the first position of FIG. 2.

The conventional stator laminations 30 each have four stator pole laminations 34 shown in FIG. 3 in the 3:00, 6:00, 9:00, and 12:00 o'clock positions. The stator pole laminations 34 form stator poles 34' of the stator 26 when the stator pole laminations are stacked. The stator poles 34' are made of a magnetic field enhancing material, such as iron, shaped to form slots 35 (best shown in FIG. 3), which receive windings 36, such as formed by winding copper wire through the stator slots around the stator poles. Orientation of the windings 36 is shown for a first winding 36a and a second winding 36b in FIGS. 2 and 3 and is additionally shown for a third winding 36c and a fourth winding 36d in FIG. 3.

Figure 5:
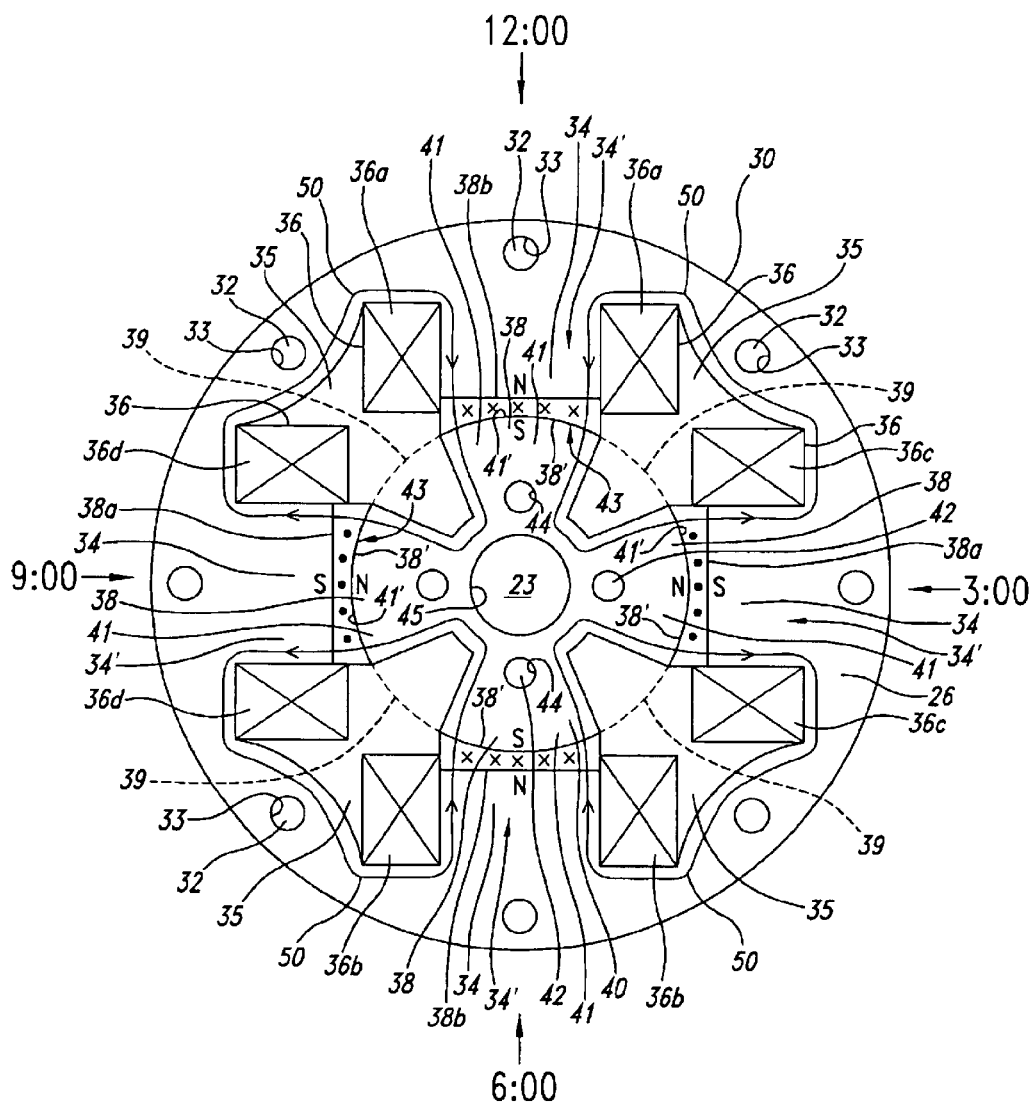
FIG. 5 is a top view of the conventional stator lamination and the conventional mover lamination pair associated with the mover in the second position of FIG. 4.

Four annular concave arc magnets 38 are each glued to a portion (seven conventional stator laminations 30 in FIG. 2) of one of the four stator poles 34' (for instance, the stator pole in the 12:00 position of FIG. 3). The annular concave arc magnet 38 is so named because its bore surface 38' opposite the stator pole 34' has a concave shape in the form of an arc being in cylindrical alignment with the other annular concave arc magnets attached to the other stator poles of the stator 26. This cylindrical alignment of the bore surfaces 38' of the annular concave arc magnets 38 is depicted by an illustrative circle 39 that is not part of the structure of the stator 26, but is shown in FIGS. 3 and 5 only for explanatory purposes.

The mover 24 is made up of collections of stacked conventional mover laminations 40 made of a magnetic field enhancing material, such as iron, and has mover sections 41 with arcuate bore surfaces 41' shaped to complement the shape of the bore surfaces 38' of the annular concave arc magnets 38.

The annular nature of the annular concave arc magnets 38 allows for the mover 24 to be shaped to fit inside the illustrative circle 39 with a gaseous gap 43 of typically one-hundredth of an inch between bore surfaces 41' of the mover sections 41 and the bore surfaces 38' of the annular concave arc magnets 38. With such an arrangement the rotational tolerances for securing the mover 24 in the conventional linear electrodynamic system 22 are not rigorous regarding the amount of rotation allowed for the mover. Since the bore surfaces 38' of the annular concave arc magnets 38 are cylindrical coincident with the illustrative circle 39, the arcuate bore surface 41' of the mover sections 41 allow the mover 24 to rotate a significant amount without contacting the stator 26 should torque on the shaft 23 cause the mover to rotate.

The conventional mover laminations 40 are held together by mover connecting rods 42 inserted through mover connecting rod holes 44. A portion of the shaft 23 is coupled to the mover 24 through shaft holes 45 in the conventional mover laminations 40.

Figure 4:
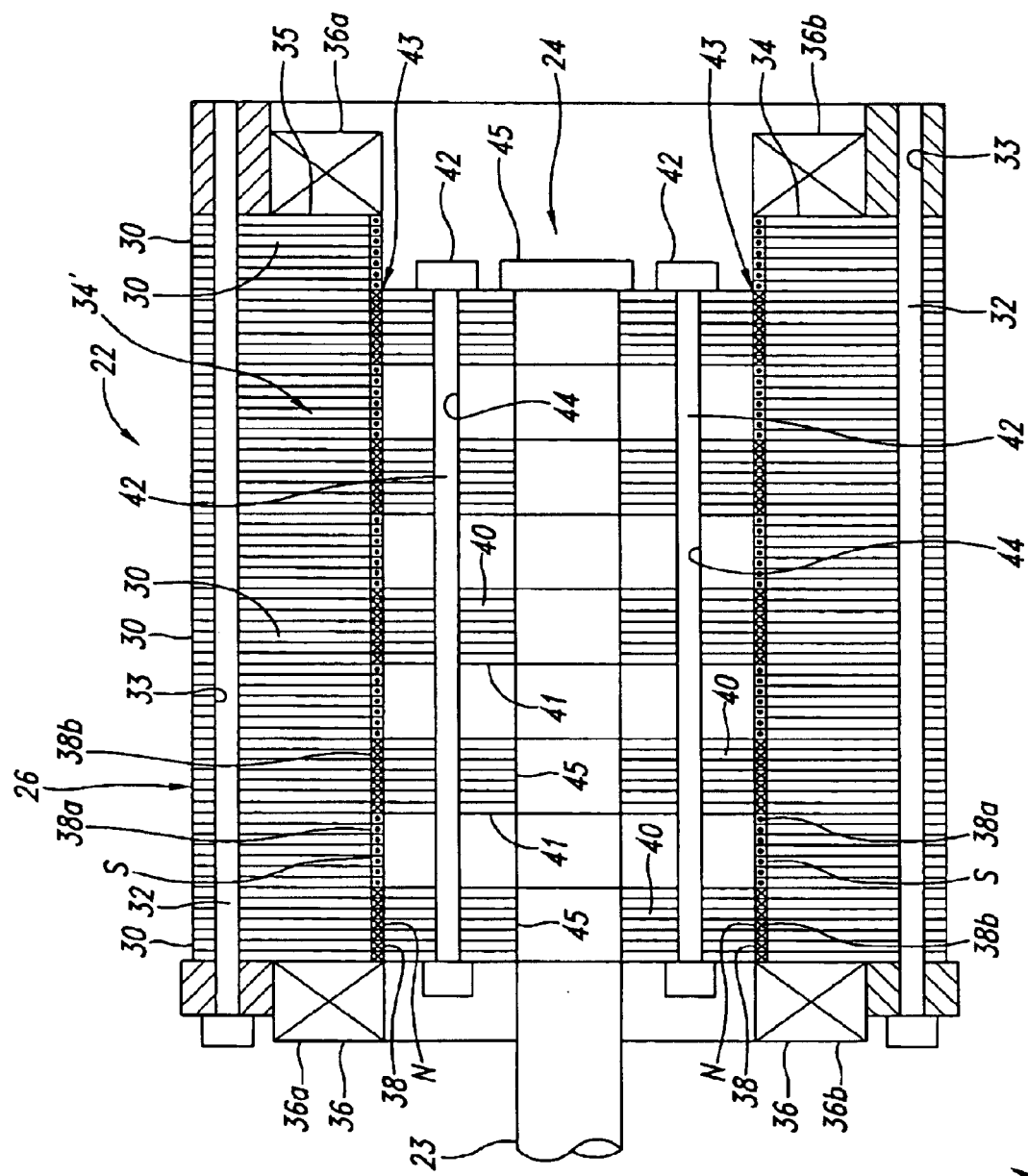
FIG. 4 is a cross-sectional view of the conventional linear electrodynamic system of FIG. 1 with its mover in a second position.

The annular concave arc magnets 38 have a first orientation 38a in which the north pole of the magnet is the bore surface 38' and a second orientation 38b in which the south pole of the magnet is the bore surface. The first orientation 38a and the second orientation 38b are alternated along the axis of the shaft 23 as shown in FIG. 2 and alternated around the 3:00, 6:00, 9:00, and 12:00 positions as shown in FIG. 3. Magnetic flux lines 50 are shown in FIG. 3 for a pair of one of the conventional stator laminations 30 and an adjacent one of the conventional mover laminations 40 when the mover 24 is in the first position shown in FIG. 2. Magnetic flux lines 51 are shown in FIG. 5 for the pair of one of the conventional stator laminations 30 and an adjacent one of the conventional mover laminations 40 when the mover 24 is in a second position shown in FIG. 4.

Figure 6:
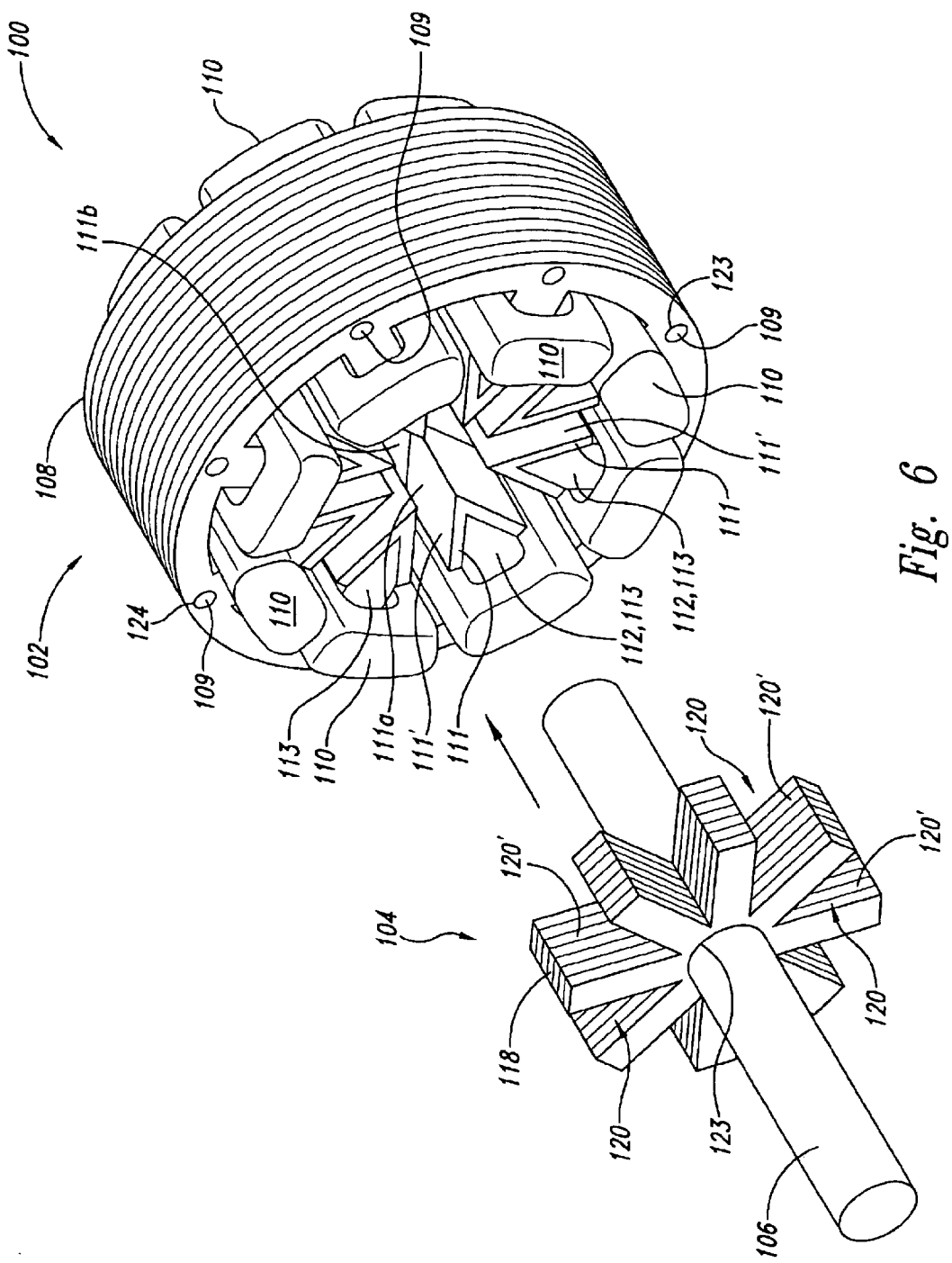
FIG. 6 is an exploded isometric view of an implementation of the innovative linear electrodynamic system according to the present invention.

An innovative linear electrodynamic system 100 is shown in FIG. 6 having an innovative stator 102, an innovative mover 104, and a shaft 106. Various implementations of the innovative stator 102 and the innovative mover 104 are described below, which result in reduced mass of the innovative linear electrodynamic system 100 compared with the conventional linear electrodynamic system 22 of comparable performance capability. Mass reduction is achieved by enhancing magnetic flux distribution through the innovative stator 102 and the innovative mover 104, reduction of size and volume of the innovative stator and the innovative mover, and reduction of the amount of metal (typically copper) required in the associated windings. Furthermore, as shown in the implementations below, the innovative stator 102 and the innovative mover 104 are more efficiently packaged to better use available space compared with conventional approaches resulting in further reductions of size of the innovative linear electrodynamic system 100.

As part of the approach used, the flux is concentrated flux by increasing total magnet volume found in the innovative linear electrodynamic system 100. With increases of magnet volume and flux concentration, the number of turns in stator windings required to develop a given voltage is reduced. Increased magnetic flux allows for decreases in outer diameter of the innovative stator 102 and more narrow poles of the innovative stator allow for smaller sized turns for stator windings. Stator mass and volume both scale with the square of stator diameter. These attributes mentioned can all factor into a significant overall reduction of mass and volume associated with the innovative linear electrodynamic system 100 compared to the conventional linear electrodynamic system 22 of comparable performance capability.

Shapes of the magnets discussed below found with the innovative linear electrodynamic system 100 also can reduce magnetic side loading on the innovative mover 104 as compared with the conventional linear electrodynamic system 22 described above.

The innovative stator 102 has stator laminations 108, which are stacked together using stator connecting rods 109. The innovative stator 102 further has windings 110, non-annular magnets 111 glued to portions of non-annular stator poles 112 made from non-annular stator pole lamination portions 113 of the stator laminations 108. The non-annular magnets 111 are designated as such because their bore surfaces 111' are not in a cylindrical arrangement such as is the arrangement depicted by the illustrative circle 39 accompanying the description above of the conventional linear electrodynamic system 22.

Being non-annular in nature is a significant departure from conventional approaches and not suggested thereby. For instance, use of non-annular magnets 111 having bore surfaces 111' with a non-annular shape requires that rotational tolerances for the innovative mover 104 be much more strict than conventional approaches since even slight rotational movement will result in the innovative mover 104 striking the innovative stator 102. In addition, the non-annular magnets 111 are so shaped that they can introduce an additional torque load on the innovative mover 104 that need not be addressed by conventional approaches. Conventional linear electrodynamic systems are designed to avoid these results.

In the first implementation of the present invention shown in FIG. 6, there are eight non-annular stator poles 112 shaped as non-annular convex V stator poles to accommodate and support the eight non-annular magnets 111 shaped as non-annular convex V magnets 116. The term "convex" is used since the bore surfaces 111' of the non-annular magnets 111 are convex. The term "V" is used due to the general "V" shape of the particular non-annular magnets 111 in this implementation. This "V" shape can be formed by gluing two flat magnet pieces together. In the depicted implementations of the innovative stator 102 discussed herein, the non-annular magnets 111 are arranged on the stacked stator laminations 108 to have first and second orientations similar to that discussed above for the conventional stator laminations 30.

Figure 7:
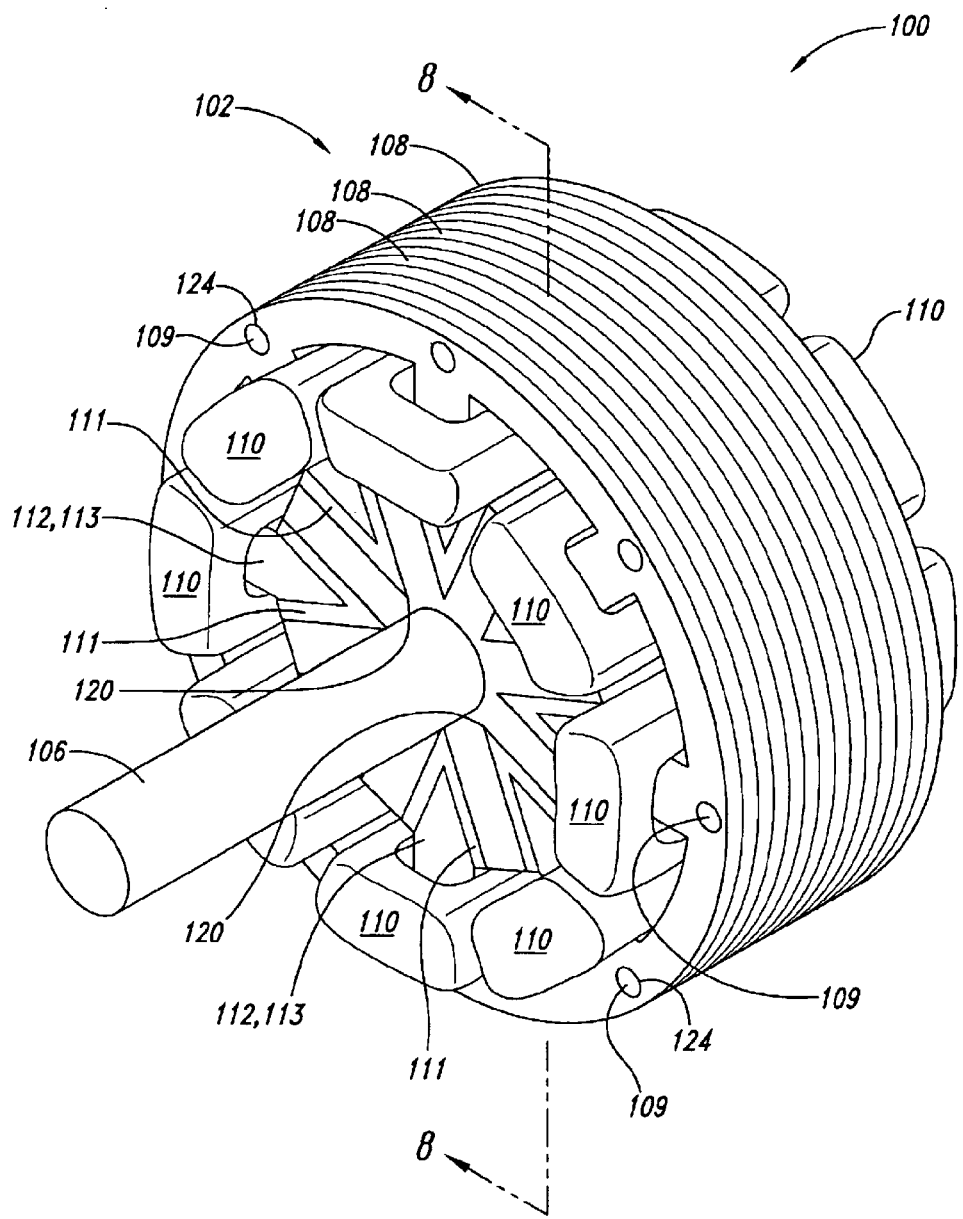
FIG. 7 is an isometric view of the implementation of the linear electrodynamic system of FIG. 6 showing the mover in a first position.
Figure 8:
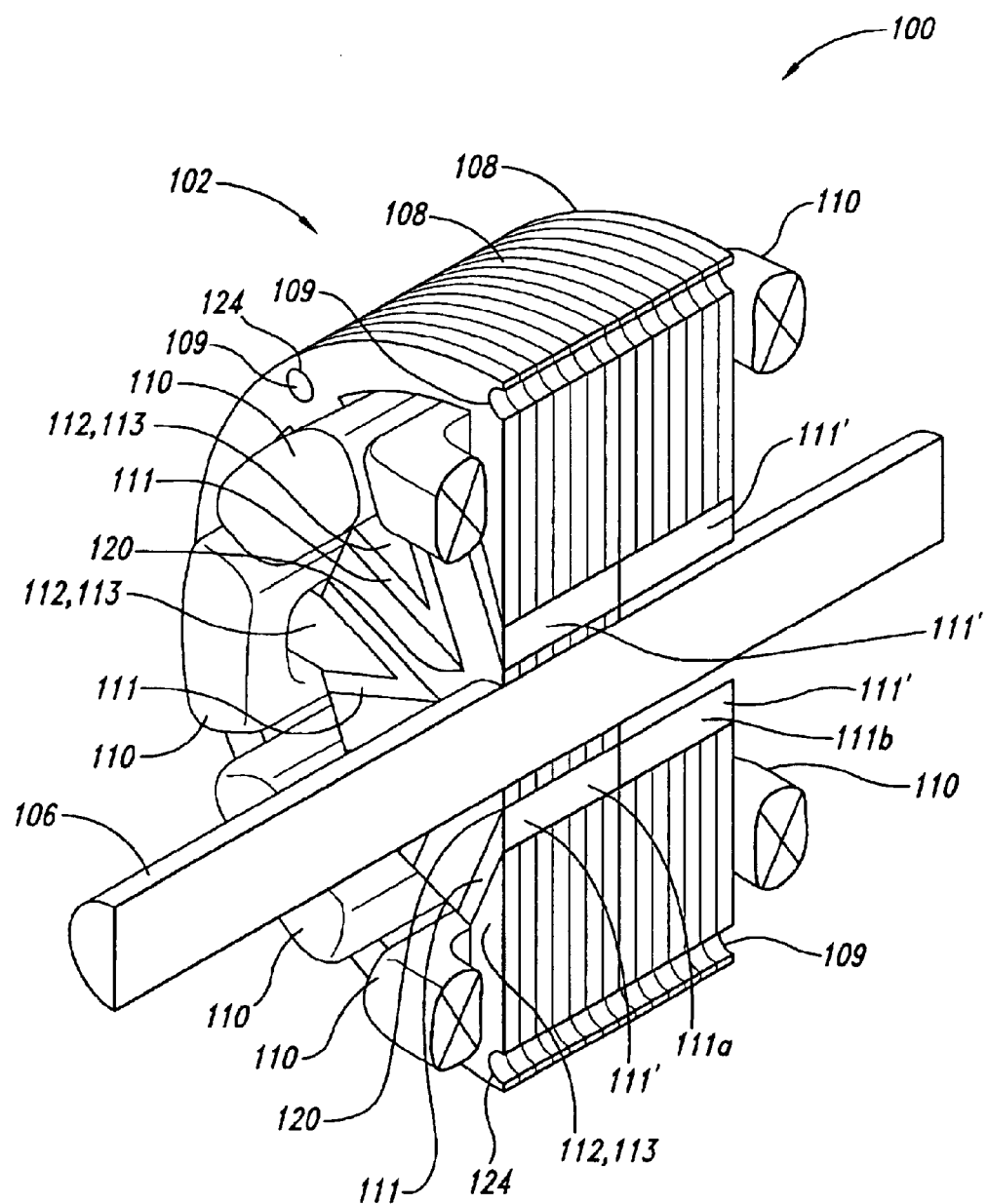
FIG. 8 is a cross-sectional isometric view taken substantially along the line 8—8 of FIG. 7.
Figure 9:
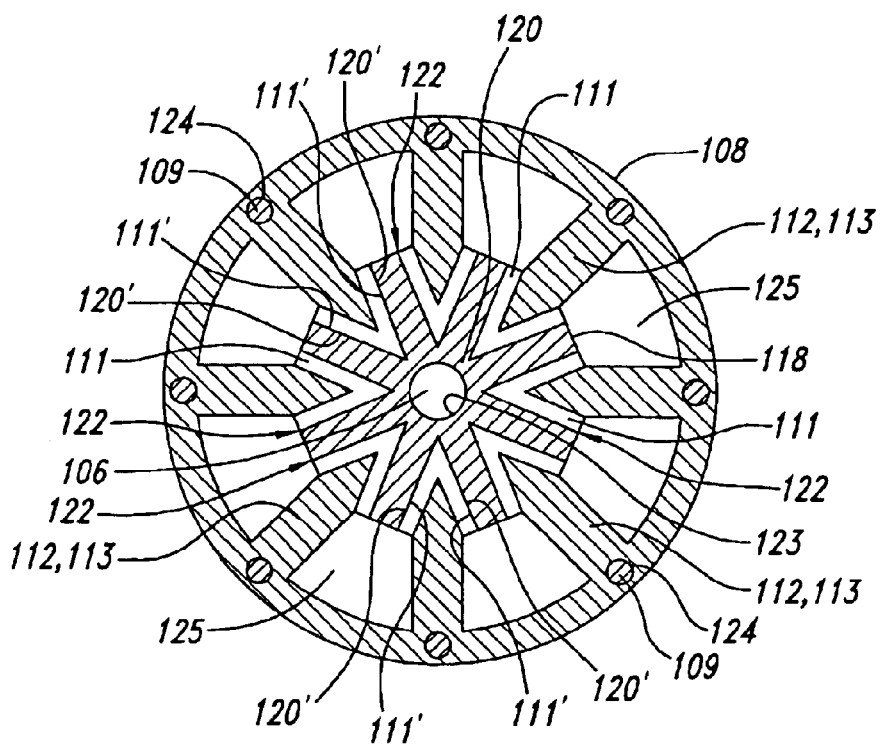
FIG. 9 is an end view of a non-annular convex eight-V implementation of a stator lamination and a mover lamination pair of the linear electrodynamic system of FIG. 6 without windings.

The innovative mover 104 is made up of mover laminations 118 which are bound together and define a plurality of non-annular mover sections 120 with bore surfaces 120'. In the particular implementation shown in FIG. 6, there are eight non-annular mover sections 120 shaped as non-annular convex V mover sections that have bore surfaces 120' complementary to the bore surfaces 111' of the eight non-annular convex V magnets 111. FIGS. 7 and 8 show the eight non-annular convex V mover sections 120 of the particular implementation shown in FIGS. 6 of the innovative mover 104 midway in its reciprocal travel within the innovative linear electrodynamic system 100. As best shown in FIG. 8, each of the eight non-annular convex V magnets 111 can be formed from two V magnets 111a and 111b glued to one of the non-annular convex V stator poles 112 at positions along the longitudinal direction of the shaft 106.

The implementation of FIGS. 6–8 is shown from the end without the windings 110 illustrated. There is a gaseous gap 122 between the bore surfaces 111' of the eight non-annular convex V magnets and the corresponding bore surfaces of the 120' of the eight non-annular mover sections 120 of the innovative mover 104. Due to the geometry, the design of the innovative linear electrodynamic system 100 allows little tolerance for rotational movement of the innovative mover 104 relative to the innovative stator 102. Movement of more than the size of the gaseous gap 122 will result in the innovative mover contacting the innovative stator. Thus, the innovative mover 104 must be retained with minimal rotational movement as the innovative mover reciprocates longitudinally within the innovative stator 102.

The mover laminations 118 each further has a central shaft hole 123 for coupling the mover lamination to the shaft 106. The innovative stator 102 has stator connecting rod holes 124 to receive the stator connecting rods 109. The innovative stator 102 further has stator slots 125 positioned between the non-annular stator poles 112 and shaped to accommodate the windings 110 with each extending above one of the non-annular stator poles 112 and shaped to accommodate the shape and positioning of the innovative mover 104. Connector rod holes (not shown) are provided in the mover laminations 118 for securing the mover laminations 118 of the innovative mover 104 together with connecting rods.

Figure 10:
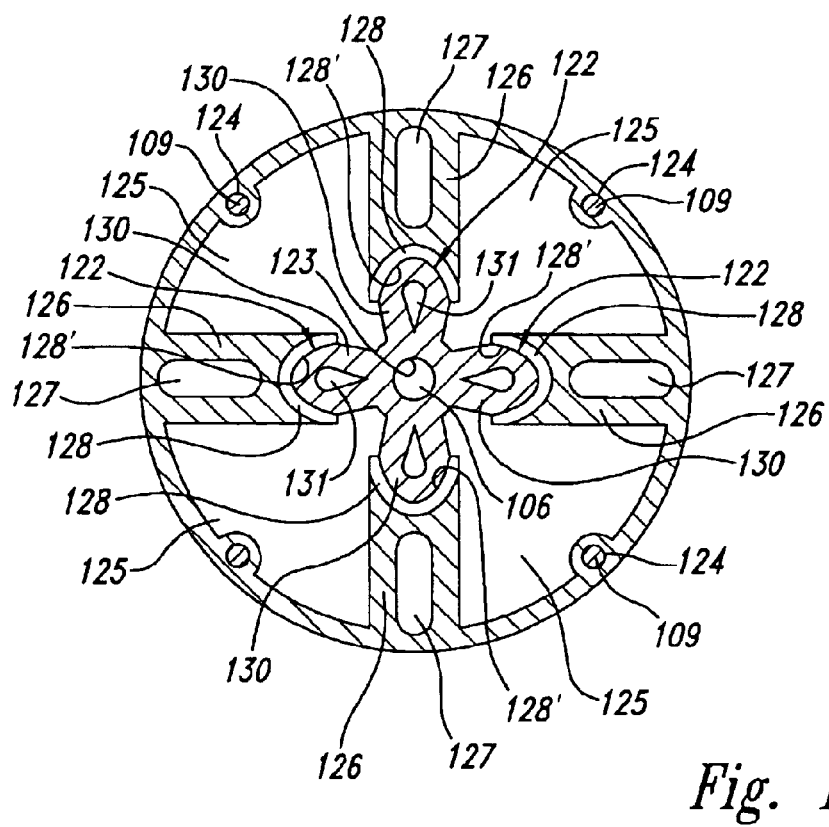
FIG. 10 is an end view of a non-annular concave four-parabolic implementation of a stator lamination and a mover lamination pair of the linear electrodynamic system according to a second embodiment of the present invention.

A second implementation of the innovative stator 102 and the innovative mover 104 is shown in FIG. 10. In this implementation, the innovative stator 102 has four non-annular concave parabolic stator poles 126 with stator pole voids 127. The stator pole voids 127 are formed to reduce the mass of the non-annular concave parabolic stator poles 126. Four non-annular concave parabolic magnets 128 are coupled to the four non-annular concave parabolic stator poles 126. The non-annular concave parabolic magnets 128 are so named because in this implementation the bore surfaces 128' of the non-annular magnets 128 have a concave parabolic shape and are non-annular in terms of the above discussion regarding the illustrative circle 39.

The innovative mover 104 of the implementation of FIG. 10 has four mover sections 130 complementary to the four non-annular concave parabolic magnets 128 such that only a gaseous gap exists between the mover sections 130 and the bore surfaces 128' of the four non-annular concave parabolic magnets 128. The mover sections 130 have mover section voids 131 to reduce the mass of the innovative mover 104 and to receive connecting rods (not shown) to hold the mover laminations together.

Figure 11:
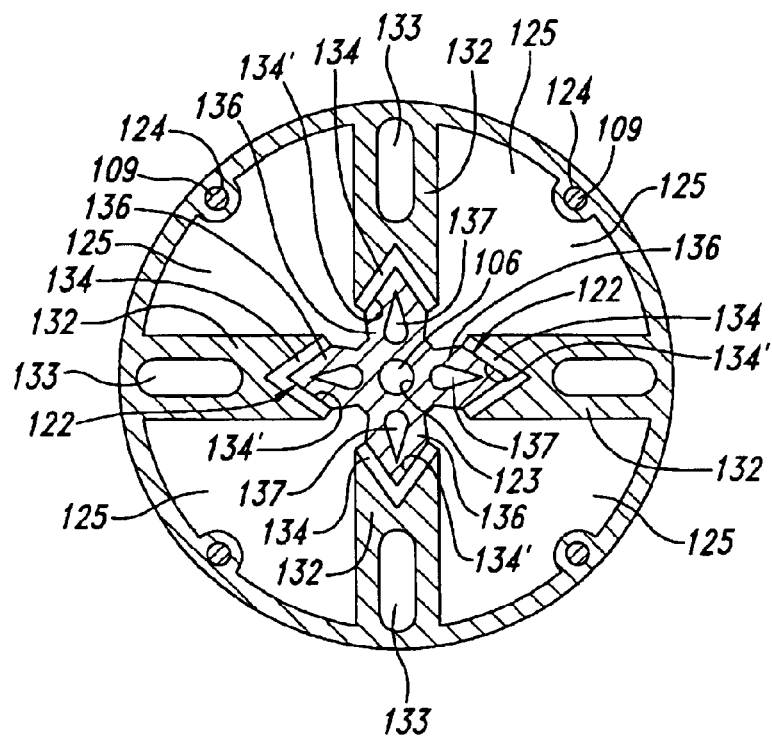
FIG. 11 is an end view of a non-annular concave four-V implementation of a stator lamination and a mover lamination pair of the linear electrodynamic system according to a third embodiment of the present invention.

A third implementation of the innovative stator 102 and the innovative mover 104 is shown in FIG. 11. In this implementation, the innovative stator 102 has four non-annular concave V stator poles 132 with stator pole voids 133. The stator pole voids 133 are formed to reduce the mass of the non-annular concave V stator poles 132. Four non-annular concave V magnets 134 are coupled to the four non-annular concave V stator poles 132. The non-annular concave V magnets 134 are so named because in this implementation the bore surfaces 134' of the non-annular magnets 134 have a concave V shape and are non-annular in terms of the above discussion regarding the illustrative circle 39.

The innovative mover 104 of the implementation of FIG. 11 has four mover sections 136 complementary to the four non-annular concave V magnets 134 such that only a gaseous gap exists between the mover sections 130 and the bore surfaces 134' of the four non-annular concave V magnets 134. The mover sections 136 have mover section voids 137 to reduce the mass of the innovative mover 104 and to receive connecting rods (not shown) to hold the mover laminations together.

Figure 12:
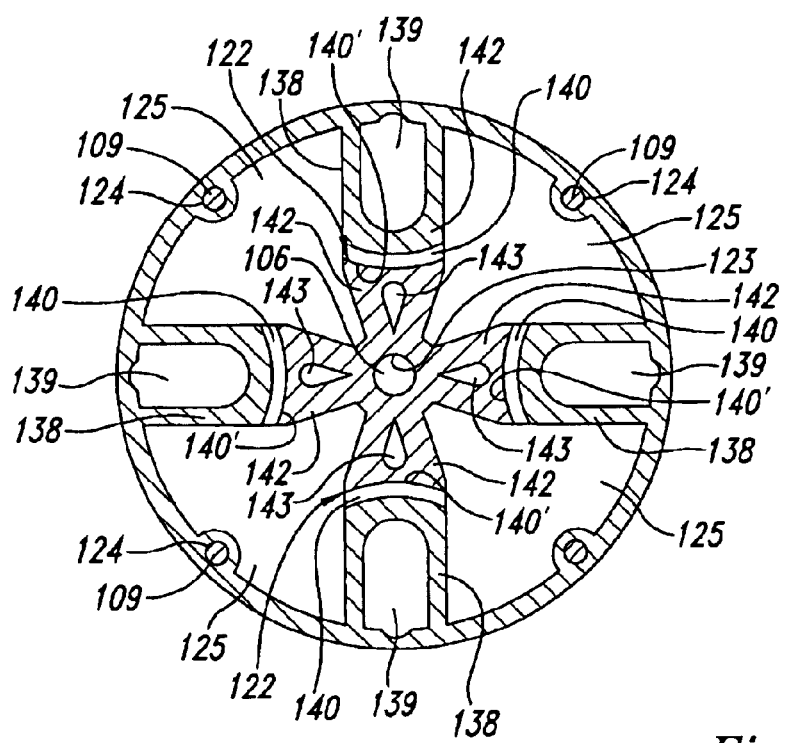
FIG. 12 is an end view of a non-annular convex four-arc implementation of a stator lamination and a mover lamination pair of the linear electrodynamic system according to a fourth embodiment of the present invention.

A fourth implementation of the innovative stator 102 and the innovative mover 104 is shown in FIG. 12. In this implementation, the innovative stator 102 has four non-annular convex arc stator poles 138 with stator pole voids 139. The stator pole voids 139 are formed to reduce the mass of the non-annular convex arc stator poles 138. Four non-annular convex arc magnets 140 are coupled to the four non-annular convex arc stator poles 138. The non-annular convex arc magnets 140 are so named because in this implementation the bore surfaces 140' of the non-annular magnets 140 have a convex arc shape and are non-annular in terms of the above discussion regarding the illustrative circle 39.

The innovative mover 104 of the implementation of FIG. 12 has four mover sections 142 complementary to the four non-annular concave arc magnets 140 such that only a gaseous gap exists between the mover sections 142 and the bore surfaces 140' of the four non-annular convex arc magnets 140. The mover sections 142 have mover sections voids 143 to reduce the mass of the innovative mover 104 and to receive connecting rods (not shown) to hold the mover laminations together.

Figure 13:
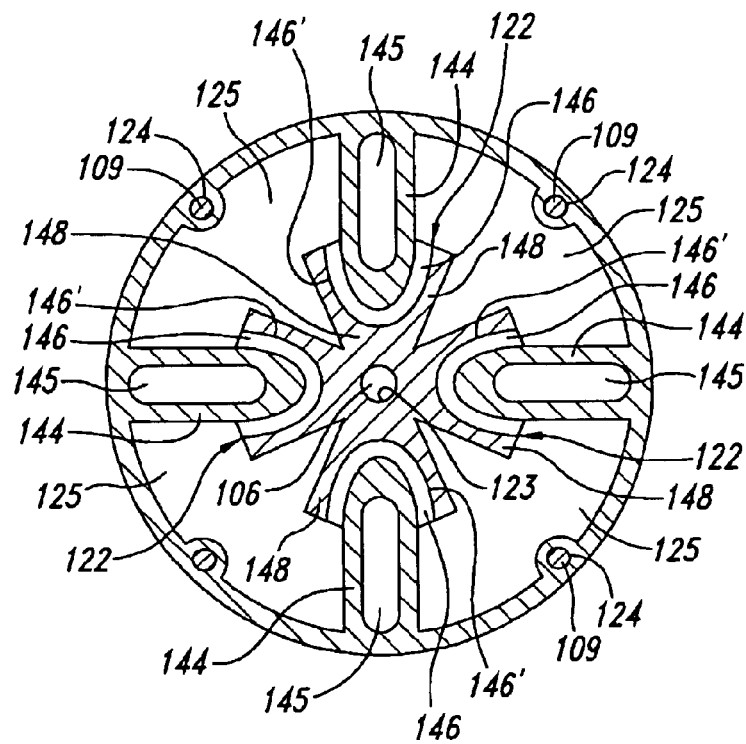
FIG. 13 is an end view of a non-annular convex four-arc implementation of a stator lamination and a mover lamination pair of the linear electrodynamic system according to the fifth embodiment of the present invention.

A fifth implementation of the innovative stator 102 and the innovative mover 104 is shown in FIG. 13. In this implementation, the innovative stator 102 has four non-annular convex parabolic stator poles 144 with stator pole voids 145. The stator pole voids 145 are formed to reduce the mass of the non-annular convex parabolic stator poles 144. Four non-annular convex parabolic magnets 146 are coupled to the four non-annular convex parabolic stator poles 144. The non-annular convex parabolic magnets 146 are so named because in this implementation the bore surfaces 146' of the non-annular magnets 146 have a convex parabolic shape and are non-annular in terms of the above discussion regarding the illustrative circle 39.

The innovative mover 104 of the implementation of FIG. 13 has four mover sections 148 complementary to the four non-annular convex parabolic magnets 146 such that only a gaseous gap exists between the mover sections 148 and the bore surfaces 146' of the four non-annular convex parabolic magnets 146. The mover sections 148 have mover sections voids (not shown) to reduce the mass of the innovative mover 104 and to receive connecting rods (not shown) to hold the mover laminations together.

Figure 14:
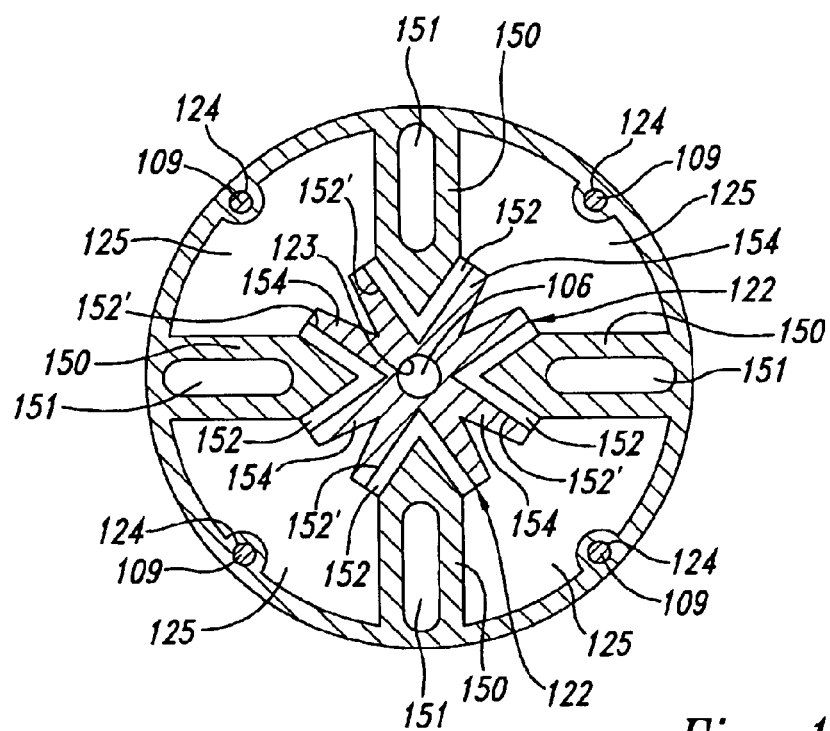
FIG. 14 is an end view of a non-annular convex four-V implementation of a stator lamination and a mover lamination pair of the linear electrodynamic system according to a sixth embodiment of the present invention.

A sixth implementation of the innovative stator 102 and the innovative mover 104 is shown in FIG. 14. In this implementation, the innovative stator 102 has four non-annular convex V stator poles 150 with stator pole voids 151. The stator pole voids 151 are formed to reduce the mass of the non-annular convex V stator poles 150. Four non-annular convex V magnets 152 are coupled to the four non-annular convex V stator poles 150. The non-annular convex V magnets 152 are so named because in this implementation the bore surfaces 152' of the non-annular magnets 152 have a convex V shape and are non-annular in terms of the above discussion regarding the illustrative circle 39.

The innovative mover 104 of the implementation of FIG. 14 has four mover sections 154 complementary to the four non-annular concave V magnets 152 such that only a gaseous gap exists between the mover sections 154 and the bore surfaces 152' of the four non-annular convex V magnets 152. The mover sections 154 have mover sections voids (not shown) to reduce the mass of the innovative mover 104 and to receive connecting rods (not shown) to hold the mover laminations together.

Figure 15:
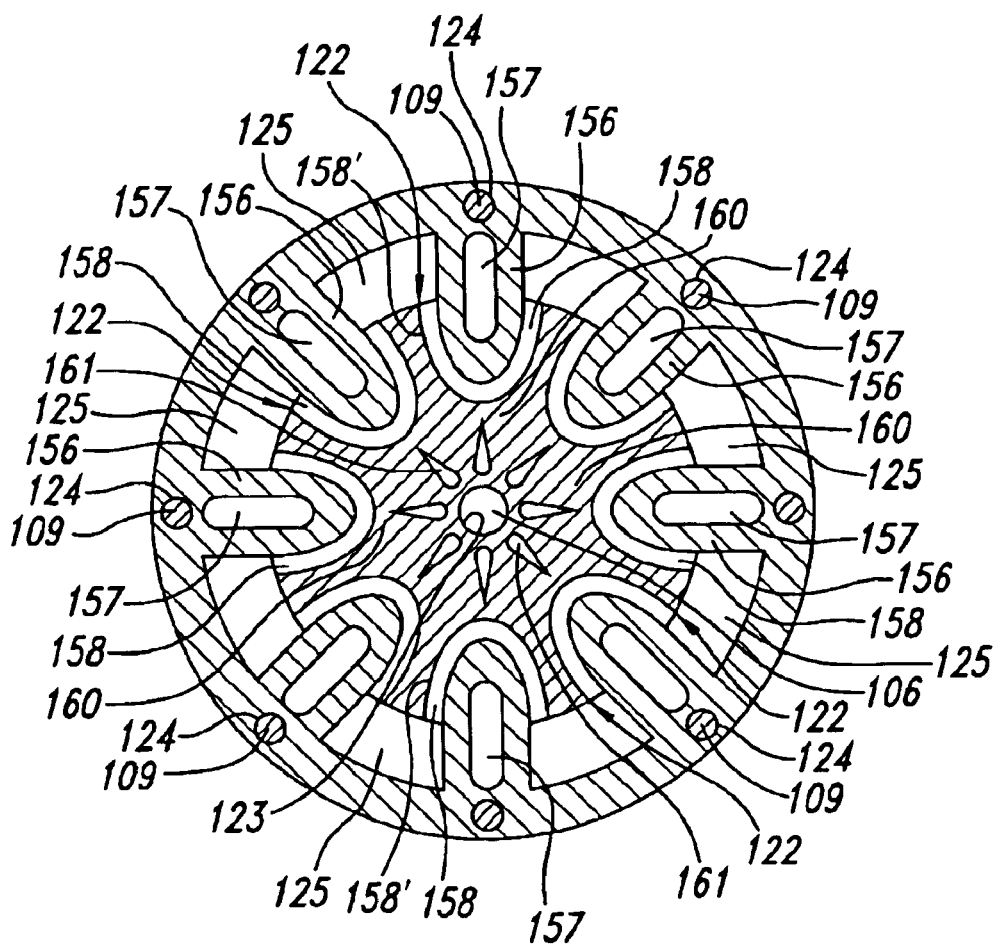
FIG. 15 is an end view of a non-annular convex eight-parabolic implementation of a stator lamination and a mover lamination pair of the linear electrodynamic system according to the seventh embodiment of the present invention.

A seventh implementation of the innovative stator 102 and the innovative mover 104 is shown in FIG. 15. In this implementation, the innovative stator 102 has eight non-annular convex parabolic stator poles 156 with stator pole voids 157. The stator pole voids 157 are formed to reduce the mass of the non-annular convex parabolic stator poles 156. Eight non-annular convex parabolic magnets 158 are coupled to the eight non-annular convex parabolic stator poles 156. The non-annular convex parabolic magnets 158 are so named because in this implementation the bore surfaces 158' of the non-annular magnets 158 have a convex parabolic shape and are non-annular in terms of the above discussion regarding the illustrative circle 39.

The innovative mover 104 of the implementation of FIG. 15 has eight mover sections 160 complementary to the eight non-annular concave parabolic magnets 158 such that only a gaseous gap exists between the mover sections 160 and the bore surfaces 158' of the eight non-annular convex parabolic magnets 158. The mover sections 160 have mover section voids 161 to reduce the mass of the innovative mover 104 and to receive connecting rods (not shown) to hold the mover laminations together.

As shown, some implementations of the innovative linear electrodynamic system 100 involve convex shapes for the bore surfaces of the non-annular magnets. These convex implementations can effectively make the non-annular stator poles longer than the non-annular stator poles for the concave implementations where the bore surfaces of the non-annular magnets are concave shape. Possible effective lengthening of the non-annular stator poles in the convex implementations can allow the outer diameter of the innovative stator 102 to be reduced without changing the volume of the windings 110 wound around the non-annular stator poles. The mass of the innovative mover 104 may also be reduced in the convex implementations since the shape of the innovative mover sections which are complementary to the bore surfaces of the non-annular magnets, are concave.

In some of the implementations shown, the number of non-annular stator poles for the innovative stator 102 was eight rather than four. Other implementations are possible including five, six, seven, eight, nine, ten, and other numbers of non-annular stator poles. As shown in FIGS. 1–5, conventional approaches have used four stator poles 34' for the stator 26 of the conventional linear electrodynamic system 22. Increasing the number of non-annular stator poles as with some implementations of the present invention can allow further increase in magnet volume and a corresponding reduction in the number of turns generally required for the windings 110 thereby further reducing total mass and size of the innovative linear electrodynamic system 100.

Although certain curvilinear and angular shapes, including V shapes and parabolas, for the bore surface of the non-annular magnets are used in the depicted implementations, other non-annular shapes for the bore surfaces of the non-annular magnets are envisioned for additional implementations to increase magnet volume while reducing the size of the non-annular stator poles for the innovative linear electrodynamic system 100 as compared with the annularly oriented conventional linear electrodynamic system 22. These non-annular shapes can include other open curves such as hyperbola, special curves, symmetrically angular shapes, or non-symmetrical or other non-regular curves or angular shapes, in distinction over conventional annular approaches to thereby increase magnet volume and to decrease the size of the non-annular stator poles for comparable performance capability and an overall mass reduction of the innovative linear electrodynamic system 100. Software such as ANSOFT Maxwell 2D/3D can be used to perform magnetic circuit analysis to help determine desired curvatures for the non-annular magnets to be further balanced with other concerns associated with performance, mass reduction, ease of component manufacture and assembly, and quality control for the innovative linear electrodynamic system 100. These various shapes can be obtained by gluing or otherwise affixing flat pieces of flat magnets to the variously shaped surfaces and/or by forming curves or other shapes into the structure of the magnets.

As discussed above, the non-annular nature of the innovative stator 102 and the innovative mover 104 is a significant departure from the conventional approach. Contrary to the conventional approach, there can only be less than an a gaseous gap for the innovative mover 104 to rotate before it strikes the innovative stator 102. Because of the extraordinary demand placed upon rotational tolerances for the innovative mover 104, the innovative linear electrodynamic system 100 is further enhanced.

Figure 16:
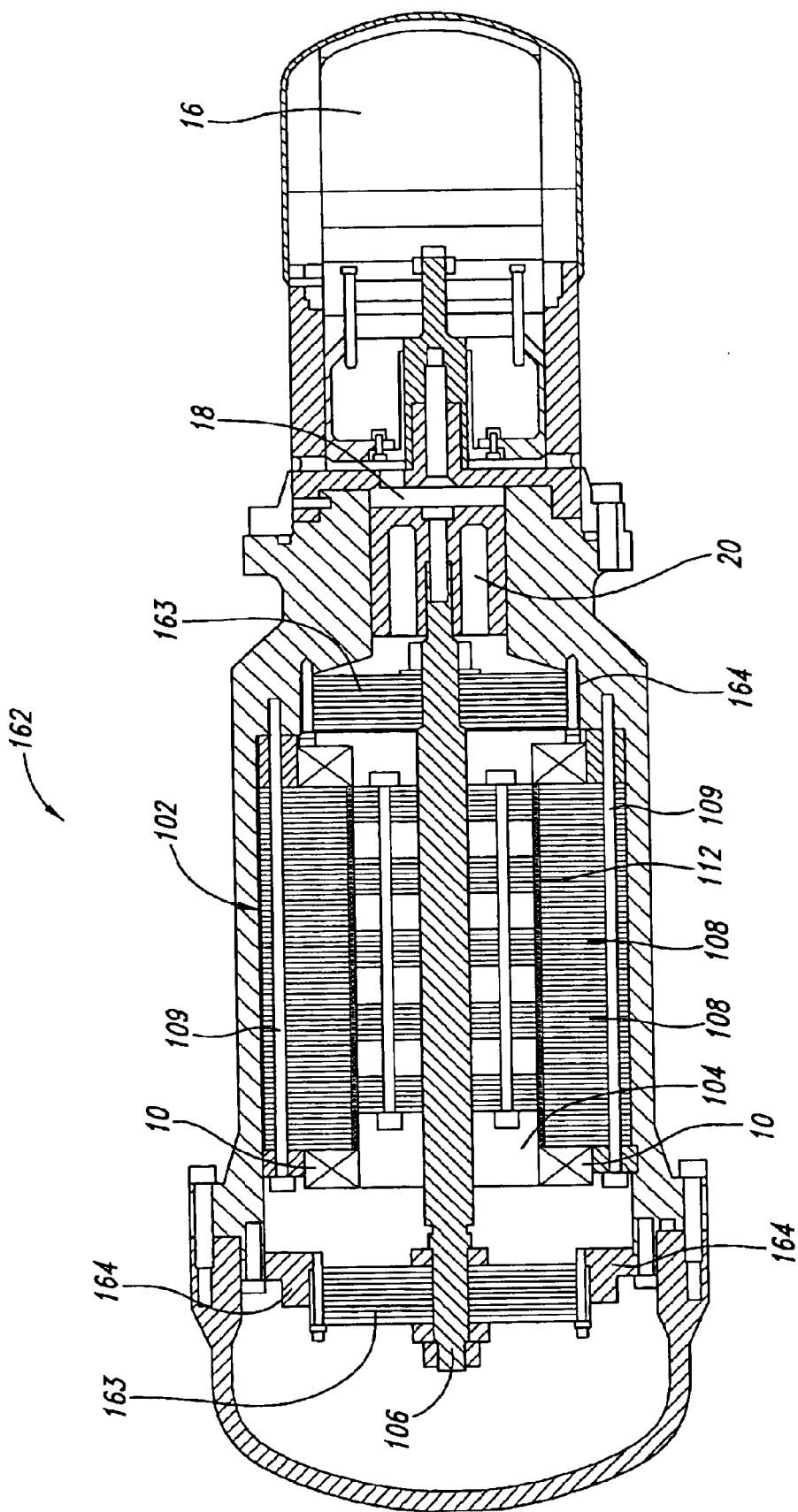
FIG. 16 is a cross-sectional view of an implementation of an electrothermal system incorporating an implementation of the linear electrodynamic system of the present invention, showing detail regarding flexure bearings.

In FIG. 16, an electrothermal system 162 is shown using the innovative linear electrodynamic system 100 of the present invention. The shaft 106 is supported by flexure bearings 163 which couple the shaft to a housing 164 to provide extraordinary rotational stiffness compared to conventional flexure bearings to meet the rotational tolerances of the innovative mover 104 to prevent contact with the innovative stator 102 as the innovative mover reciprocates longitudinally.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A linear electrodynamic system comprising:

a housing;

a longitudinal shaft movably coupled to the housing to longitudinally and linearly reciprocate relative to the housing in the longitudinal direction of the shaft;

a stator rigidly coupled to the housing, the stator shaped to define an inner space to receive a portion of the longitudinal shaft, the stator having stator poles extending inwardly toward that portion of the longitudinal shaft received by the stator;

windings wound around the stator poles;

magnetic material affixed to a portion of each of the stator poles, the magnetic material having bore surfaces facing inward; and a mover affixed to the shaft, the mover having bore surfaces facing outward in correspondence with the bore surfaces of the magnetic material to define a gaseous gap between each of the correspondingly positioned ones of the bore surfaces of the magnetic material and the mover, portions of the bore surfaces of the magnetic material being closer to the shaft than portions of the bore surfaces of the mover, the bore surface of each magnetic material affixed to a portion of one of the stator poles having a V shape, the bore surface of each magnetic material affixed to a portion of one of the stator poles having a concave shape.

2. A linear electrodynamic system comprising:

a housing;

a longitudinal shaft movably coupled to the housing to longitudinally and linearly reciprocate relative to the housing in the longitudinal direction of the shaft;

a stator rigidly coupled to the housing, the stator shaped to define an inner space to receive a portion of the longitudinal shaft, the stator having stator poles extending inwardly toward that portion of the longitudinal shaft received by the stator;

windings wound around the stator poles;

magnetic material affixed to a portion of each of the stator poles, the magnetic material having bore surfaces facing inward; and a mover affixed to the shaft, the mover having bore surfaces facing outward in correspondence with the bore surfaces of the magnetic material to define a gaseous gap between each of the correspondingly positioned ones of the bore surfaces of the magnetic material and the mover, portions of the bore surfaces of the magnetic material being closer to the shaft than portions of the bore surfaces of the mover, the bore surface of each magnetic material affixed to a portion of one of the stator poles having a parabolic shape, the bore surface of each magnetic material affixed to a portion of one of the stator poles having a concave shape.

3. A linear electrodynamic system comprising:

a stator with inwardly extending stator poles, the stator defining an inner space with the stator poles positioned at the inner space;

windings wound around the stator poles;

magnetic material affixed to a portion of each of the stator poles, the magnetic material having bore surfaces facing inward toward the inner space; and a mover positioned within the inner space for longitudinal and linear reciprocal movement therein, the mover having bore surfaces facing outward in correspondence with the bore surfaces of the magnetic material to define a gaseous gap between each of the correspondingly positioned ones of the bore surfaces of the magnetic material and the mover, the bore surfaces of the magnetic material and the mover having mating non-annular shapes, the bore surface of each magnetic material affixed to a portion of one of the stator Doles having a V shape, the bore surface of each magnetic material affixed to a portion of one of the stator poles having a concave shape.

4. A linear electrodynamic system comprising:

a stator with inwardly extending stator poles, the stator defining an inner space with the stator poles positioned at the inner space:

windings wound around the stator poles;

magnetic material affixed to a portion of each of the stator poles, the magnetic material having bore surfaces facing inward toward the inner space; and a mover positioned within the inner space for longitudinal and linear reciprocal movement therein, the mover having bore surfaces facing outward in correspondence with the bore surfaces of the magnetic material to define a gaseous gap between each of the correspondingly positioned ones of the bore surfaces of the magnetic material and the mover, the bore surfaces of the magnetic material and the mover having mating non-annular shapes, the bore surface of each magnetic material affixed to a portion of one of the stator Doles having a parabolic shape, the bore surface of each magnetic material affixed to a portion of one of the stator poles having a concave shape.

5. A linear electrodynamic system comprising:

a housing;

a longitudinal shaft movably coupled to the housing to longitudinally and linearly reciprocate relative to the housing in the longitudinal direction of the shaft;

a stator rigidly coupled to the housing, the stator shaped to define an inner space to receive a portion of the longitudinal shaft, the stator having stator poles extending inwardly toward that portion of the longitudinal shaft received by the stator;

windings wound around the stator poles;

magnetic material affixed to a portion of each of the stator poles, the magnetic material having concave shaped bore surfaces facing inward; and a mover affixed to the shaft, the mover having bore surfaces facing outward in correspondence with the concave shaped bore surfaces of the magnetic material to define a gaseous gap between each of the correspondingly positioned ones of the concave shaped bore surfaces of the magnetic material and the bore surfaces of the mover, portions of the concave shaped bore surfaces of the magnetic material being closer to the shaft than portions of the bore surfaces of the mover.

* * * * *